US007136656B2

(12) United States Patent
Fisher

(10) Patent No.: US 7,136,656 B2
(45) Date of Patent: *Nov. 14, 2006

(54) METHOD OF FAST DYNAMIC CHANNEL ALLOCATION CALL ADMISSION CONTROL FOR RADIO LINK ADDITION IN RADIO RESOURCE MANAGEMENT

(75) Inventor: Xiaochun Xu Fisher, E. Setauket, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 200 days.

This patent is subject to a terminal disclaimer.

(21) Appl. No.: 10/750,129

(22) Filed: Dec. 31, 2003

(65) Prior Publication Data

US 2004/0218578 A1    Nov. 4, 2004

Related U.S. Application Data

(60) Provisional application No. 60/456,644, filed on Mar. 20, 2003.

(51) Int. Cl.
*H04Q 7/20* (2006.01)

(52) U.S. Cl. ............ 455/452.1; 455/450; 455/452.2; 370/328; 370/332; 370/458

(58) Field of Classification Search ............ 455/450, 455/451, 452.1, 452.2, 412.1, 414.1, 464, 455/509, 512, 513, 63.1, 67.11, 67.13; 370/230, 370/235, 241.1, 280, 331, 335, 337, 345, 370/328, 329

See application file for complete search history.

(56) References Cited

U.S. PATENT DOCUMENTS

| 5,359,596 | A | * | 10/1994 | Sadiq | 370/362 |
|---|---|---|---|---|---|
| 6,473,442 | B1 | * | 10/2002 | Lundsjo et al. | 370/537 |
| 6,487,415 | B1 | * | 11/2002 | Eibling et al. | 455/453 |
| 6,791,961 | B1 | * | 9/2004 | Zeira et al. | 370/335 |
| 2001/0036823 | A1 | | 11/2001 | Van Lieshout et al. | |
| 2002/0003782 | A1 | * | 1/2002 | Pan et al. | 370/280 |
| 2002/0009061 | A1 | | 1/2002 | Willenegger | |
| 2002/0094817 | A1 | | 7/2002 | Rune et al. | |
| 2002/0119783 | A1 | * | 8/2002 | Bourlas et al. | 455/453 |
| 2002/0119796 | A1 | * | 8/2002 | Vanghi | 455/522 |
| 2003/0123388 | A1 | * | 7/2003 | Bradd | 370/230 |
| 2004/0214582 | A1 | * | 10/2004 | Lan et al. | 455/452.2 |
| 2005/0148337 | A1 | * | 7/2005 | Karlsson et al. | 455/453 |
| 2005/0190729 | A1 | * | 9/2005 | Roy et al. | 370/336 |

\* cited by examiner

*Primary Examiner*—Jean Gelin
(74) *Attorney, Agent, or Firm*—Volpe and Koenig, P.C.

(57) ABSTRACT

A method of fast dynamic channel allocation call admission control for radio link addition includes a pre-code allocation process, a signal-independent code allocation process, and a post-code allocation process. The pre-code allocation process receives and processes a request message, retrieves the new cell identification from the message, and retrieves the old cell identification and system information from a centralized database. The code allocation process checks the availability of a code set in the new cell, generates timeslot sequences for the available timeslots, and assigns a code set to the available timeslots in a timeslot sequence, wherein a successful assignment is a solution. The interference signal code power (ISCP) is calculated for each solution and the solution having the lowest weighted ISCP is selected as an optimal solution. The post-code allocation process stores the new radio link information in the database and creates a response message with new allocation information.

29 Claims, 6 Drawing Sheets

METHOD OF FAST DYNAMIC CHANNEL ALLOCATION CALL ADMISSION CONTROL FOR RADIO LINK ADDITION IN RADIO RESOURCE MANAGEMENT

CROSS REFERENCE TO RELATED APPLICATIONS

This application claims priority from U.S. Provisional Application No. 60/456,644, filed Mar. 20, 2003, which is incorporated by reference as if fully set forth herein.

FIELD OF THE INVENTION

The present invention relates generally to radio resource management in wireless communication systems, and more particularly to a fast dynamic channel allocation (F-DCA) call admission control (CAC) algorithm for radio link addition in radio resource management (RRM).

BACKGROUND OF THE INVENTION

In wireless communication systems, RRM is generally responsible for utilizing the air interface resources. RRM is used to guarantee quality of service (QoS), to provide efficient use of the radio resources, and to increase system capacity. RRM consists of admission control, handover, power control, and congestion control functionalities. Admission control can be divided into user admission control and call admission control (CAC). User admission control accepts or rejects the radio resource control (RRC) connection requested by a wireless transmit/receive unit (WTRU). Call admission control accepts or rejects a request to establish or modify a radio access bearer (RAB) in the radio access network (RAN). Call admission control is located in the controlling radio network controller (C-RNC).

There are two dynamic channel allocation (DCA) functions, slow DCA and fast DCA (S-DCA, F-DCA). The S-DCA allocates the radio resources to cells while the F-DCA allocates the radio resources to bearer service. The F-DCA call admission control functions are responsible for efficiently allocating or changing the allocations of physical resources. When a request for physical resources is received, the call admission control will accept or reject the request based on the availability of physical resources and interference level in the cell. The request can be accepted only if both uplink and downlink call admission control admit it. Otherwise, the request is rejected.

Handover is used to switch a radio link from one cell to another without interruption of the call in order to maintain the required QoS. The radio link addition procedure is used to establish physical resources for a new radio link in a Node B for which a WTRU already has a communication context when a handover is taking place.

In order to guarantee the QoS and minimize the interference, a certain F-DCA call admission control algorithm is currently implemented. But the previous implementation of the F-DCA call admission control algorithm has several limitations. One limitation is that it is difficult to be reused by other RRM functions since the main interface function is large, and the inputs to the code allocation function (which forms the core function of the F-DCA call admission control algorithm), are dependent on the signal message. A second limitation is that the past implementation of the F-DCA CAC algorithm is generally only suitable for real time (RT) service.

It is desirable to provide an optimized implementation of the F-DCA CAC algorithm for radio link addition which is suitable for real time (RT) service and non-real time (NRT) service, and which overcomes the disadvantages of the known algorithms.

SUMMARY OF THE INVENTION

The present invention provides an implementation of the F-DCA CAC algorithm for radio link addition procedure in RRM. The present invention modularizes the F-DCA CAC algorithm for radio link addition into three processes: pre-code allocation, code allocation, and post-code allocation. The functions in both the pre-code allocation process and the post-code allocation process are signal-dependent while the functions in code allocation process are signal-independent. The modularized functions of the present invention can be reused by other RRM algorithms in future RRM implementations in both RT service and NRT service.

The pre-code allocation process is used to describe how and where to retrieve the information from the radio link addition request message, RRM cell database and WTRU database, and how to prepare the required inputs for the code allocation process. The post-code allocation process is used to determine what information should be stored in the RRM cell database and the WTRU database, and what information should be provided to radio link addition response message.

A method of implementing F-DCA CAC algorithm for radio link addition in a wireless communication system includes a pre-code allocation process, a signal-independent code allocation process, and a post-code allocation process. The pre-code allocation process includes receiving and processing a radio link addition request message, and retrieving system information from a centralized database. The code allocation process includes checking the availability of a code set in the cell; generating timeslot sequences; assigning a code set to the available timeslots in a timeslot sequence, wherein a successful assignment is a solution; calculating the interference signal code power (ISCP) for each solution; and selecting the solution having the lowest weighted ISCP as an optimal solution. The post-code allocation process includes storing allocation information in the centralized database and creating a radio link addition response message.

A method of implementing F-DCA CAC algorithm for radio link addition in a wireless communication system begins by receiving a radio link addition request message to initiate the CAC function. The request message is processed and a list of available timeslots and a list of code sets are retrieved from a centralized database. The code sets are allocated to the available timeslots in the new cell, and the allocation information is stored in the centralized database. A radio link addition response message is then sent with the results of the code allocation process.

BRIEF DESCRIPTION OF THE DRAWINGS

A more detailed understanding of the invention may be had from the following description of a preferred embodiment, given by way of example, and to be understood in conjunction with the accompanying drawings wherein.

DETAILED DESCRIPTION OF PREFERRED EMBODIMENT

Figure 1:
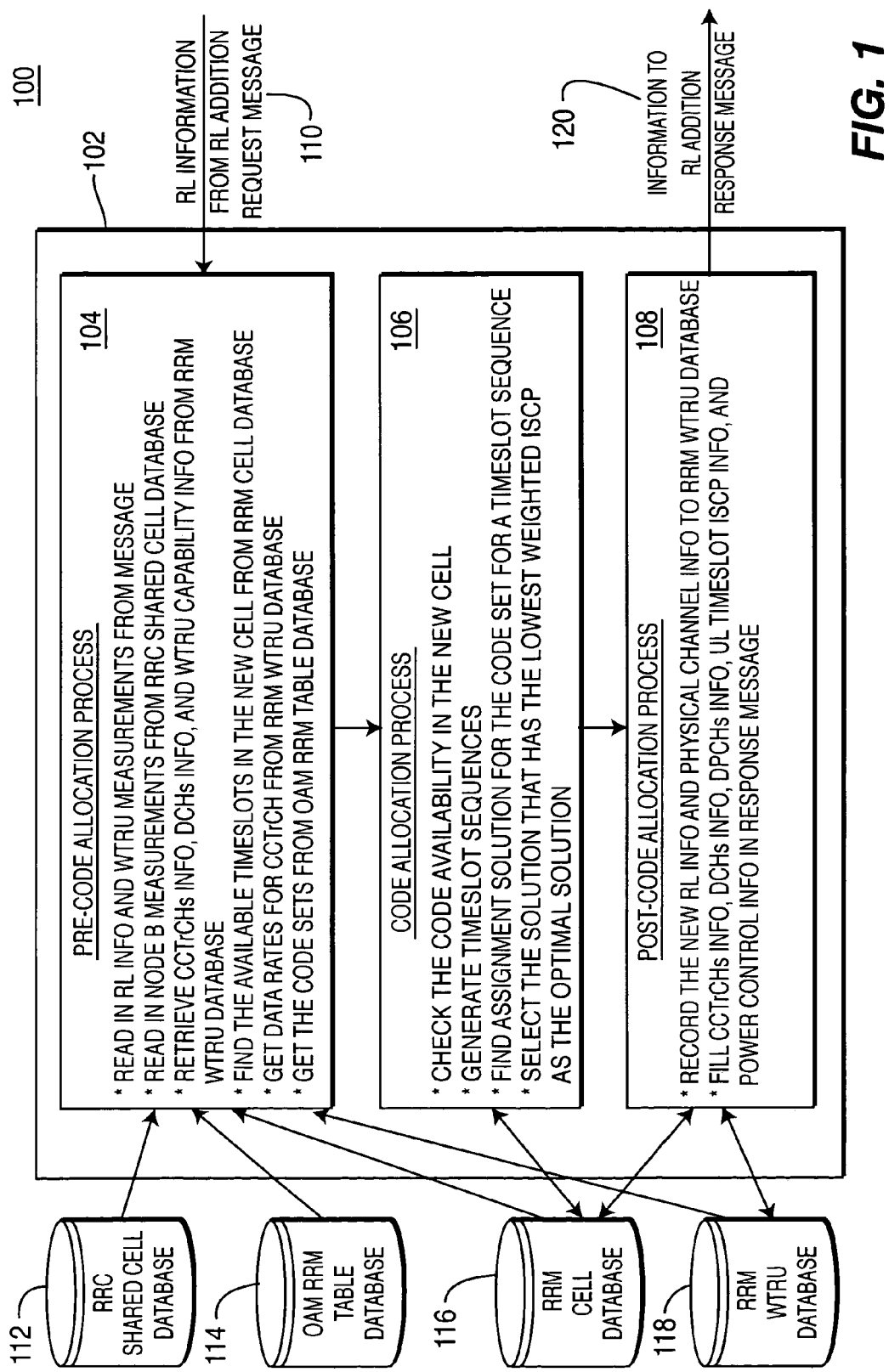
FIG. 1 is an overview of a F-DCA CAC procedure for radio link addition in accordance with the present invention.

An overview 100 of a F-DCA CAC procedure for radio link addition 102 is shown in FIG. 1. The main function of the F-DCA CAC procedure 102 consists of three parts: a pre-code allocation process 104, a code allocation process 106, and a post-code allocation process 108. The pre-code allocation process 104 reads WTRU measurements from a radio link addition request message 110 (hereinafter "request message"), reads Node B measurements from a RRC shared cell database 112, and retrieves coded composite transport channel (CCTrCH) information, dedicated channel (DCH) information, and WTRU capability information from a RRM WTRU database 118. The pre-code allocation process 104 also retrieves a list of the available timeslots in the new cell from a RRM cell database 116, gets the data rate for the CCTrCH from a RRM WTRU database 118, and gets the code sets from an operations and maintenance (OAM) RRM table database 114.

The code allocation process 106 checks the code availability in the new cell, generates timeslot sequences for the available timeslots, finds the optimal solution for the code set (assigns the codes in the code sets to the available timeslots), and allocates the channelized codes from the code vectors in the RRM cell database 116. The post-code allocation process 108 is responsible for updating code vector information in the RRM cell database 116, recording the new radio link information and physical channel information in the RRM WTRU database 118, and recording CCTrCHs information, DCHs information, dedicated physical channels (DPCHs) information, uplink timeslot interference signal code power (UL ISCP) information, and power control information in a radio link addition response message 120.

In addition to the data exchanges between the processes and the databases, there are data exchanges occurring directly between the processes. The WTRU measurements, the Node B measurements, a list of the available timeslots in the cell, a list of code sets for the specific data rate, and WTRU capability information are passed from the pre-code allocation process 104 to the code allocation process 106. The physical channel information (a list of timeslots and channelized codes in each timeslot) are passed from the code allocation process 106 to the post-code allocation process 108.

In the present invention, the functions of the F-DCA CAC procedure for radio link addition 102 are modularized into two groups of functions: signal-dependent functions whose inputs are parts of signal messages and signal-independent functions whose inputs are independent of signal messages. The purpose of separating the signal-dependent functions and the signal-independent functions is to increase reusability of the signal-independent functions. The functions of both the pre-code allocation process 104 and the post-code allocation process 108 are signal-dependent functions. In contrast, the functions of the code allocation process 106 are signal-independent functions. Therefore, the reusability of signal-independent functions is higher than that of the signal-dependent functions. Certain functions which are inherently signal-dependent are converted in the preferred embodiment of the present invention from being signal-dependent to signal-independent, thereby increasing the reusability of the converted functions.

The flowcharts for functions of the F-DCA CAC procedure for radio link addition are shown in FIGS. 2 and 3.

Figure 2A:
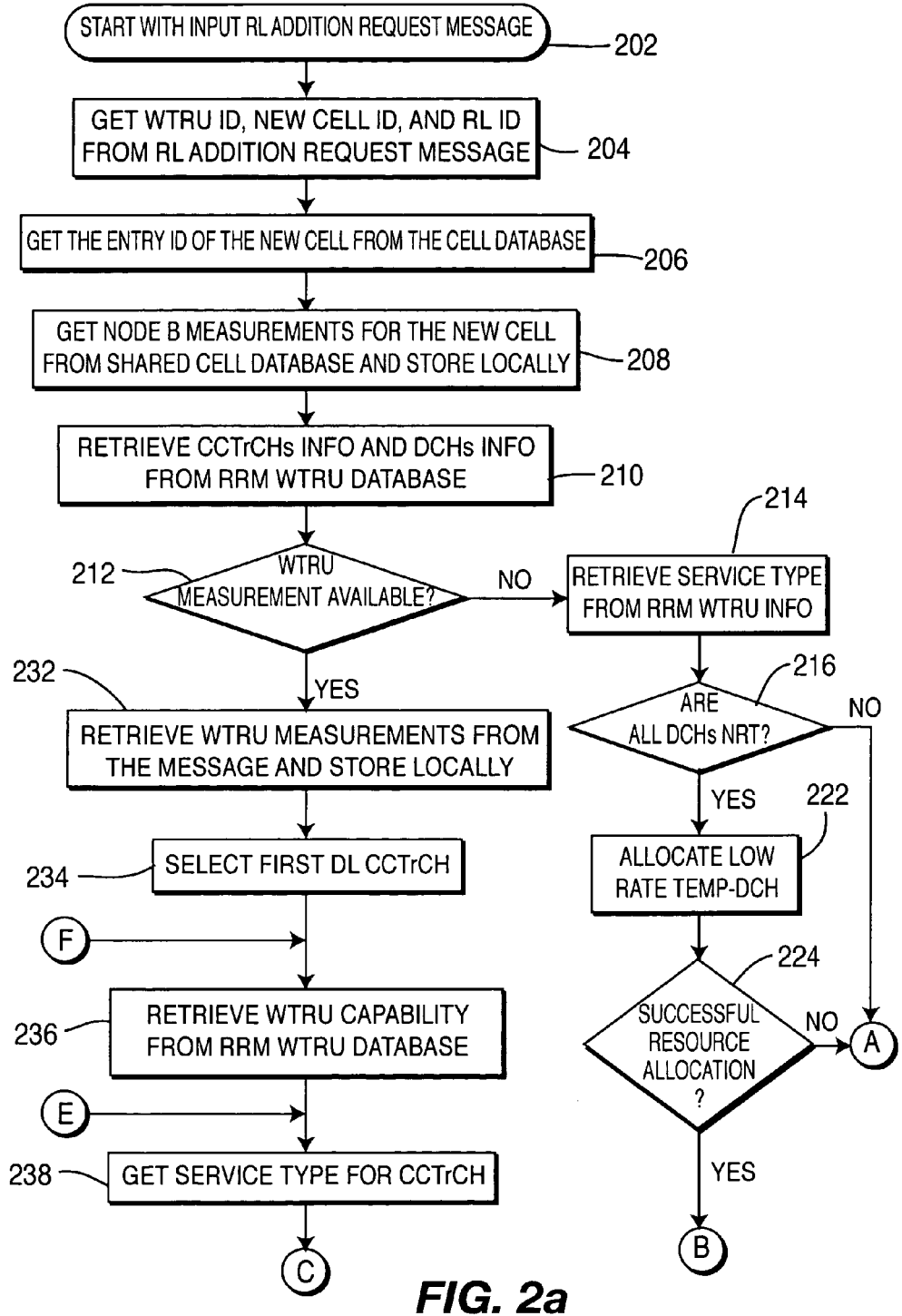
FIGS. 2a–2c are a flowchart of the F-DCA CAC procedure shown in FIG. 1.
Figure 2B:
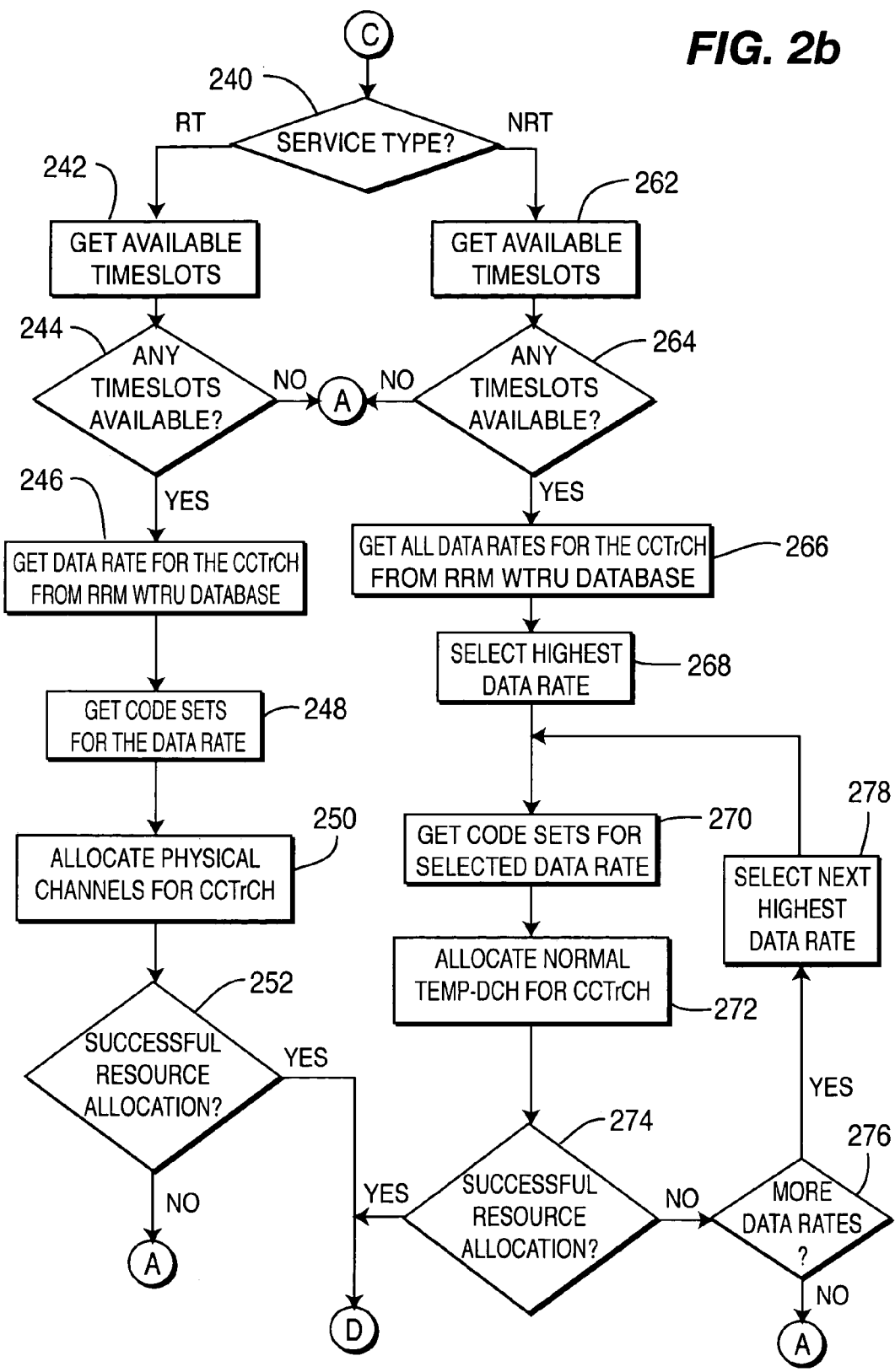
Figure 2C:
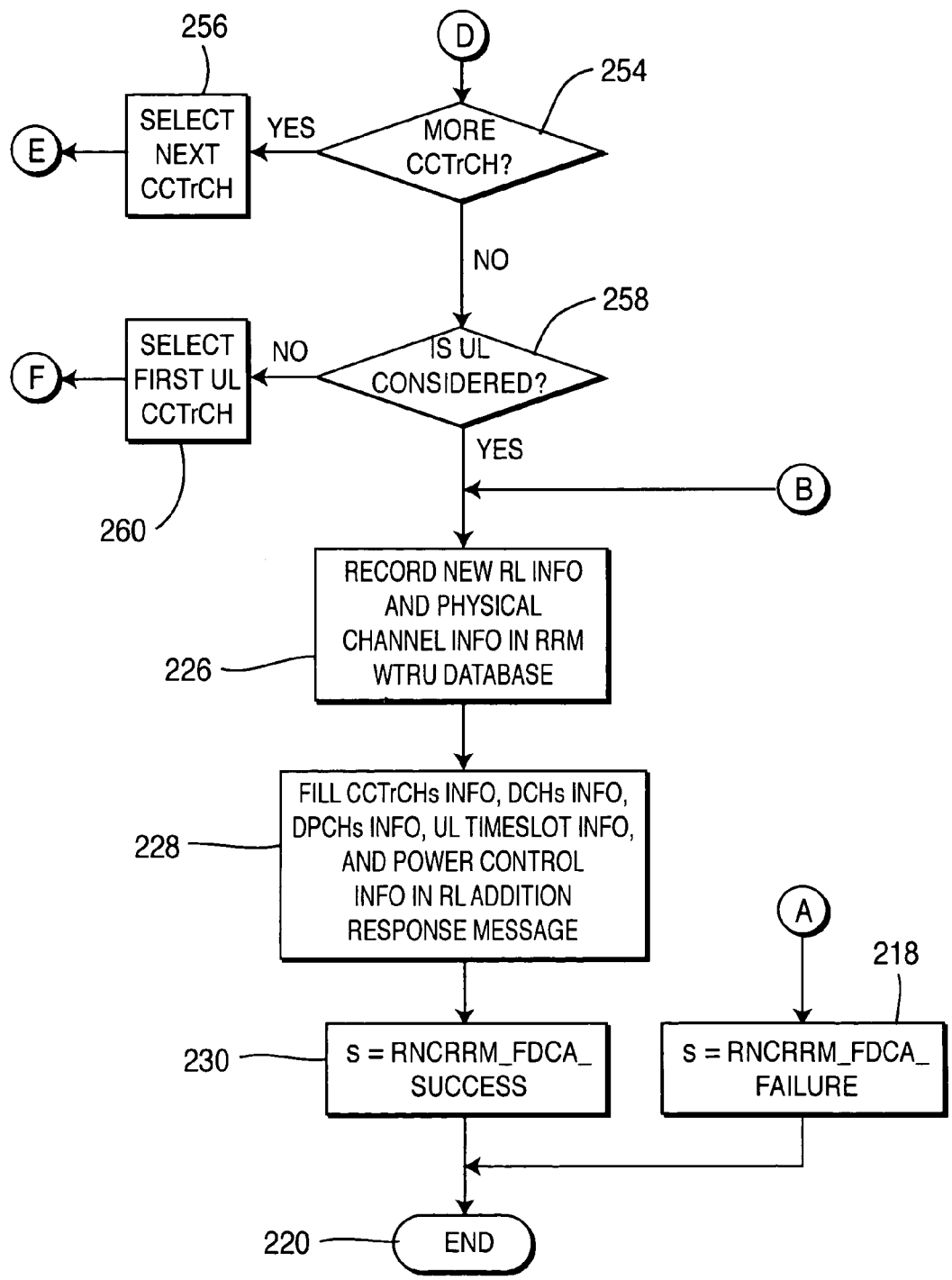
Figure 3A:
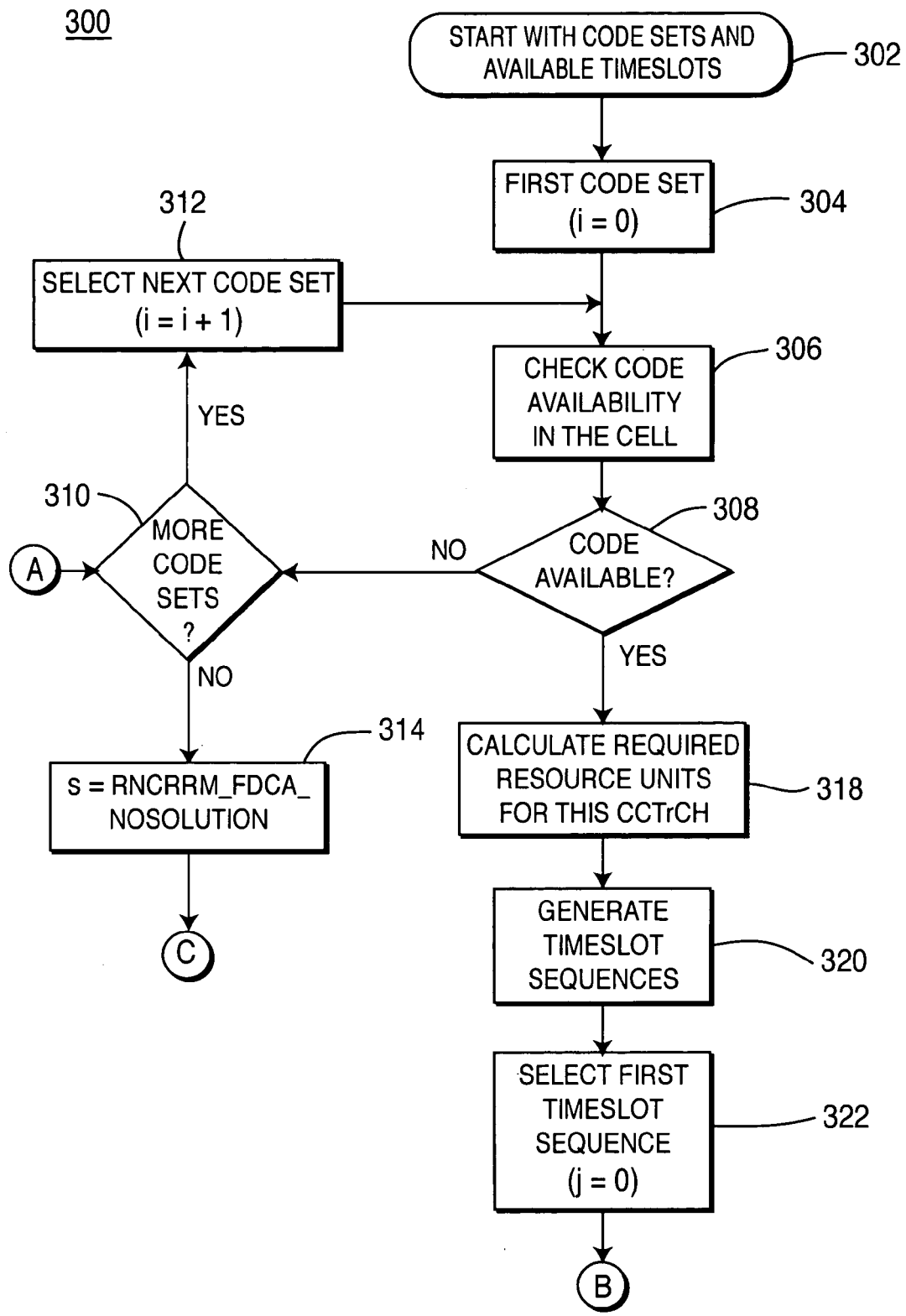
FIGS. 3a–3b are a flowchart for the channel allocation function used in connection with the procedure shown in FIG. 2.
Figure 3B:
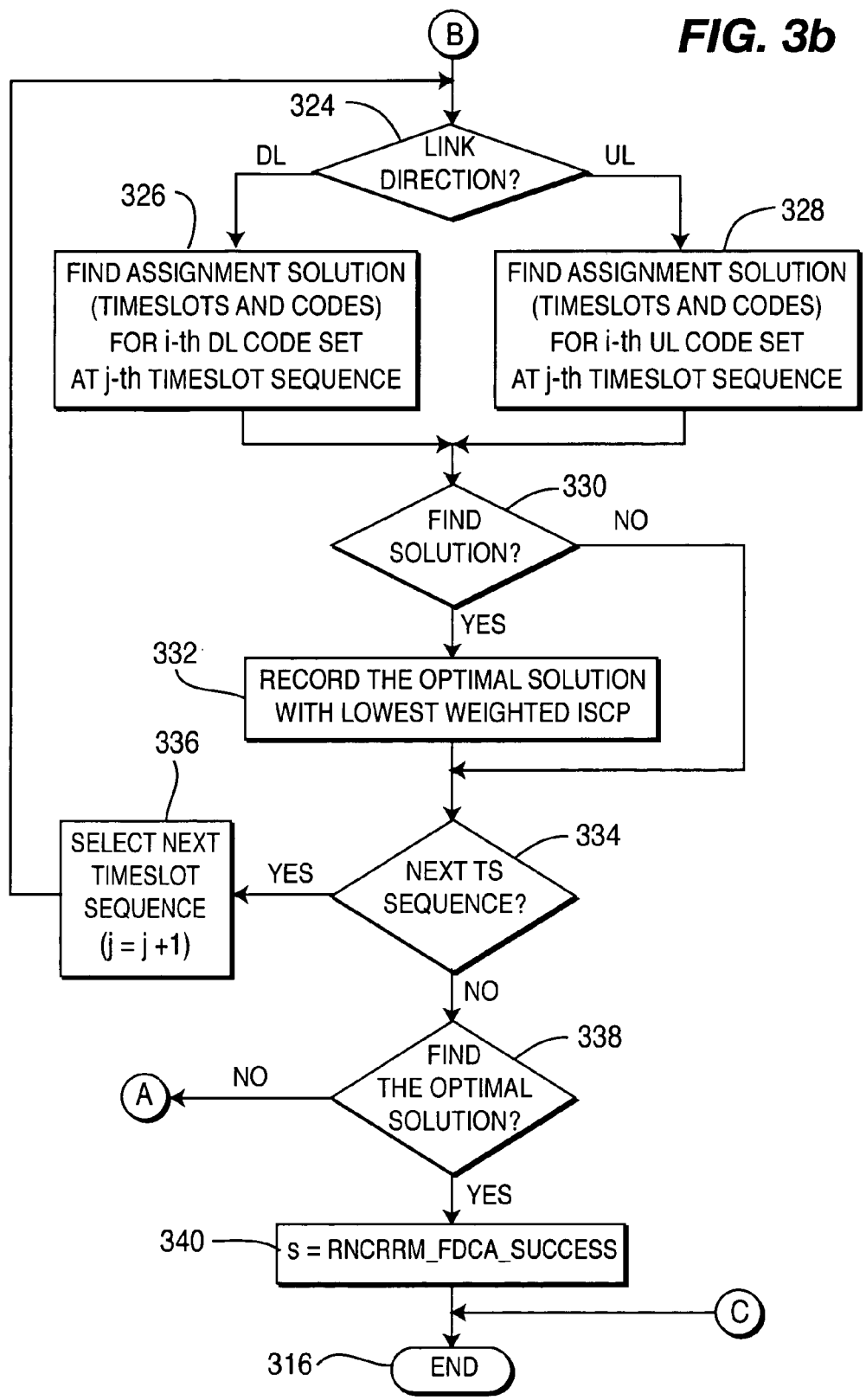

FIGS. 2a–2c show the main interface function 200 for the F-DCA CAC for radio link (RL) addition procedure. The function 200 begins by obtaining the RL addition request message (step 202) and extracting the WTRU identification, the new radio link identification, and the new cell identification from the request message (step 204). The request message also contains new RL information with or without WTRU measurements.

The entry identification of a new cell in the RRM cell database is obtained (step 206). The Node B measurements for the new cell are obtained from the RRC shared cell database and are stored locally in a measurement data structure (step 208). The measurement data structure is stored in the F-DCA CAC function dynamically. It is created after the F-DCA CAC function is called and deleted when the F-DCA CAC function is exited. The Node B measurements include common measurements and dedicated measurements. The Node B common measurements include the UL ISCP information and the downlink (DL) transmitted carrier power. The Node B dedicated measurements include the DL transmitted code power. Then, the old cell identification is retrieved based on the WTRU ID from the RRM WTRU database; CCTrCHs information and DCHs information belonging to that WTRU's radio link in the old cell are retrieved from RRM WTRU database (step 210).

Next, a determination is made whether the WTRU measurements, which include the downlink interference signal code power (DL ISCP) and the downlink primary common control physical channel received signal code power (P-CCPCH RSCP), are included in the request message (step 212). If the WTRU measurements are not included in the request message, then the service type is retrieved from the RRM WTRU information (step 214) and a check is made to determine whether all of the DCHs are NRT (step 216).

If all the DCHs are not NRT, then a status flag is set to indicate a failure condition (step 218) and the function terminates (step 220). The failure condition here means that there is not enough information to process the function further. It is noted that all the DCHs not being NRT alone is not a failure condition; the failure condition is reached when there are no WTRU measurements and all of the DCHs are not NRT. If all of the DCHs are NRT (step 216), then the low rate temporary DCHs are allocated for both uplink (UL) and downlink (DL) CCTrCHs (step 222). After the channels are allocated, a determination is made whether the resource allocations were successful (step 224). If the resource allocations were not successful, then the status flag is set to indicate a failure condition (step 218) and the function terminates (step 220). If the resource allocations were successful, then the new RL information and the physical channel information are recorded in the RRM WTRU database, and the code vector information is updated in the RRM cell database (step 226).

The recorded information includes the new RL information and the new RRC transaction identification. The RL information includes the RL identification, the cell identification, the UL CCTrCH information, and the DL CCTrCH information. The CCTrCH information includes the CCTrCH identification, the CCTrCH status, the CCTrCH signal to interference (SIR) target, the guaranteed data rate, the allowed data rate, and the dedicated physical channel (DPCH) information. The DPCH information includes a list of DPCH timeslot information, a repetition period value, and a repetition length value. The DPCH timeslot information includes the timeslot number, the midamble shift and burst type, the transport format code indicator (TFCI) presence, and a list of code information. The code information includes the channelized code, the code usage status, the DPCH identification, and the code SIR target.

The updated code vector information includes both UL code vector information and DL code vector information. The UL code vector information includes a code identification, a code block indication, and a code usage status. The DL code vector information includes a code identification and a code usage status.

If the WTRU measurements are available in the request message (step 212), then the WTRU measurements are retrieved from the request message and are stored locally (step 232).

The first DL CCTrCH is selected (step 234) and the WTRU capability information is retrieved from the RRM WTRU database based on the WTRU identification, the link direction, and the old cell identification (step 236). The service type for the selected CCTrCH is obtained from the RRM WTRU database (step 238). If the service type is real time (RT; step 240), the available timeslots in the cell are determined (step 242). If no timeslots are available (step 244), the status flag is set to indicate a failure condition (step 218) and the procedure terminates (step 220).

If there are timeslots available in the new cell (step 244), then the highest requested data rate for this CCTrCH in the old cell is retrieved from the RRM WTRU database (step 246). The code sets for the requested data rate are obtained (step 248) and the physical channels (timeslots and codes) for the present CCTrCH are allocated and the optimal solution is recorded if found (step 250). The allocation function in step 250 is discussed in greater detail below in connection with FIGS. 3a and 3b. If the resource allocation was not successful (step 252), then the status flag is set to indicate a failure condition (step 218) and the procedure terminates (step 220).

If the resource allocation was successful (step 252), then a determination is made whether there are additional CCTrCHs in the current direction (i.e., downlink or uplink) to be examined (step 254). If there are additional CCTrCHs to be examined, then the next CCTrCH is selected (step 256) and the procedure continues at step 238. If there are no additional CCTrCHs to be examined (step 254), then a determination is made whether the UL CCTrCHs have been examined (step 258). If the UL CCTrCHs have not been examined, then the first UL CCTrCH is selected (step 260) and the procedure continues at step 236. If all of the UL CCTrCHs have been considered (step 258), then the procedure continues at step 226 as described above.

Next, CCTrCHs information with newly allocated physical channel information, DCHs information, UL timeslot ISCP information, and power control information are placed into a RL addition response message (step 228), the status flag is set to indicate a success condition (step 230), and the procedure terminates (step 220). The CCTrCH information includes the CCTrCH identification and the dedicated physical channel (DPCH) information. The DPCH information includes a list of timeslot information, a repetition period and a repetition length. The DPCH timeslot information includes the timeslot number, the midamble shift and burst type, the transport format code indicator (TFCI) presence, and a list of code information. The code information includes the channelized code, and the DPCH identification. The DCHs information includes diversity indication and choice diversity indication. The power control information includes the UL target SIR, the maximum UL SIR, the minimum UL SIR, the initial DL transmission power, the maximum DL transmission power, and the minimum DL transmission power.

If the service type is NRT (step 240), the available timeslots in the new cell are determined (step 262). If no timeslots are available in the new cell (step 264), then the status flag is set to indicate a failure condition (step 218) and the procedure terminates (step 220).

If there are timeslots available in the new cell (step 264), then all data rates suitable for the NRT service of the CCTrCH are retrieved from the RRM WTRU database (step 266) and the highest data rate is selected (step 268). The code sets for the selected data rate are obtained (step 270) and the normal temporary DCHs for the present CCTrCH are allocated and the optimal solution is recorded if found (step 272). It is noted that steps 250 and 272 are essentially the same; in NRT service, the DCHs are temporary. If the resource allocation was not successful (step 274), then a determination is made whether there are additional data rates to be examined (step 276). If there are no other data rates to be examined, then the status flag is set to indicate a failure condition (step 218) and the procedure terminates (step 220). If there are other data rates to be examined (step 276), then the next highest data rate is selected (step 278) and the procedure continues at step 270. If the resource allocation was successful (step 274), then the procedure continues at step 254 as described above.

It is noted that in connection with steps 234, 258, and 260 that either direction (DL or UL) can be performed first. As described above, the DL direction is examined prior to the UL direction. The function 200 will operate in the same manner if instead the UL was examined prior to the DL.

The steps 250 and 272 relate to calling the core function of the F-DCA CAC algorithm to allocate the channels. This core function 300 is signal-independent and is described in connection with FIGS. 3a and 3b. The function 300 begins by receiving the code sets, the available timeslots, and the WTRU capability information and measurement data structure as inputs (step 302). As described above, the measurement data structure includes both WTRU measurements and Node B measurements. The first code set is selected (step 304) and a determination is made whether the code set is available in the cell (steps 306 and 308). If the selected code set is not available in the cell, then a determination is made whether there are more code sets to be examined (step 310). If there are more code sets, then the next code set is selected (step 312) and the function continues with step 306. If there are no more code sets, this indicates a failure condition, and a status flag is set to indicate that no solution is available (step 314) and the function terminates (step 316).

If the selected code set is available in the cell (step 308), then the required resource units for the code set in the CCTrCH are calculated (step 318). The timeslot sequences for the available timeslots are generated (step 320) and the first timeslot sequence is selected (step 322). The link direction, either downlink (DL) or uplink (UL), is then determined (step 324). If the link direction is DL, then an attempt is made to assign the current DL code set into the available timeslots in the current timeslot sequence (step 326). If the link direction is UL (step 324), then an attempt is made to assign the current UL code set into the available timeslots in the current timeslot sequence (step 328). In an alternate embodiment of the present invention (not shown), step 324 can be eliminated and steps 326 and 328 can be combined into a single step, to provide additional optimization.

After an attempt has been made to assign the current code set to the current timeslot sequence (steps 326, 328), a determination is made whether an assignment solution has been found (step 330), indicating that the code set was successfully assigned to the available timeslots in the timeslot sequence. If a solution has been found, then the interference signal code power (ISCP) of the solution is determined, and the solution having the lowest weighted ISCP is considered to be the optimal solution and is recorded (step 332). If no solution was found (step 330), then step 332 is skipped.

Next, a determination is made whether there are any additional timeslot sequences to be considered (step 334). If there are additional timeslot sequences, then the next timeslot sequence is selected (step 336) and the function continues with step 324. If there are no additional timeslot sequences (step 334), then a determination is made whether an optimal solution has been found (step 338). If no optimal solution has been found, then the function continues with step 310. If the optimal solution has been found, then the status flag is set to indicate a successful assignment (step 340) and the function terminates (step 316).

In past implementations of F-DCA CAC, the functions 326 and 328 are signal-dependent. In the present invention, these two functions are modified to become signal-independent functions. All related functions used in these two functions are also modified to become signal-independent functions. Because the inputs of the functions 326 and 328 are independent of the signal message (such as the RL addition request message), the functions 326 and 328 can be used by other RRM procedures.

It is noted that the above-described implementation of the F-DCA CAC algorithm is exemplary and can be further optimized by converting other functions to become signal-independent. For example, as discussed above, the steps 326 and 328 can be combined into a single step, and step 324 can be eliminated. Although the preferred embodiments are described in conjunction with a third generation partnership program (3GPP) wideband code division multiple access (W-CDMA) system utilizing the time division duplex (TDD) mode, the embodiments are applicable to any hybrid code division multiple access (CDMA)/time division multiple access (TDMA) communication system. Additionally, some embodiments are applicable to CDMA systems, in general, using beamforming, such as the proposed frequency division duplex (FDD) mode of 3GPP W-CDMA. While specific embodiments of the present invention have been shown and described, many modifications and variations could be made by one skilled in the art without departing from the scope of the invention. The above description serves to illustrate and not limit the particular invention in any way.

What is claimed is:

1. A method for call admission control for radio link addition in a fast dynamic channel allocation wireless communication system, comprising:
   a pre-code allocation process;
   a signal-independent code allocation process, including:
     checking the availability of a code set in the new cell;
     generating timeslot sequences for the available timeslots;
     assigning a code set to the available timeslots in a timeslot sequence, wherein a successful assignment is a solution;
     calculating the interference signal code power (ISCP) for each solution; and
     selecting the solution having the lowest weighted ISCP as an optimal solution; and
   a post-code allocation process.

2. The method according to claim 1, wherein the pre-code allocation process includes:
   receiving a radio link addition request message;
   processing the request message; and
   retrieving system information from a centralized database.

3. The method according to claim 2, wherein the processing the request message step includes:
   reading wireless transmit/receive unit (WTRU) measurements from the request message; and
   retrieving the WTRU identification, the new radio link identification, and the new cell identification from the request message.

4. The method according to claim 2, wherein the retrieving step includes:
   retrieving Node B measurements for the new cell;
   obtaining the old cell identification;
   reading wireless transmit/receive unit (WTRU) coded composite transport channel (CCTrCH) information and dedicated channel information;
   retrieving WTRU capability information;
   retrieving a list of available timeslots in the new cell;
   retrieving data rates for CCTrCHs; and
   retrieving a list of code sets for the requested data rate.

5. The method according to claim 1, wherein the post-code allocation process includes:
   storing allocation information in a centralized database; and
   creating a radio link addition response message.

6. The method according to claim 5, wherein the storing step includes:
   recording new radio link information from the request message in the database; and
   recording physical channel information in the database.

7. The method according to claim 5, wherein the creating step includes:
   adding coded composite transport channel information to the response message;
   adding physical channel information to the response message;
   adding dedicated channel information to the response message;
   adding uplink timeslot ISCP information to the response message; and
   adding power control information to the response message.

8. A method for call admission control (CAC) for radio link addition in a fast dynamic channel allocation wireless communication system, comprising the steps of:
   receiving a request message to initiate the CAC function;
   processing the request message;
   retrieving Node B measurements from a centralized database;
   reading wireless transmit/receive unit (WTRU) coded composite transport channel (CCTrCH) information and dedicated channel information from the centralized database;
   retrieving WTRU capability information from the centralized database;
   retrieving a list of available timeslots in the new cell from the centralized database;
   retrieving data rates for CCTrCHs from the centralized database;
   retrieving a list of code sets for the requested data rate from the centralized database;
   allocating the code sets to the available timeslots in the new cell;
   storing the new radio link (RL) information and allocation information in the centralized database; and creating a response message with the results of the code allocation process.

9. The method according to claim 8, wherein the processing step includes:
   retrieving the WTRU identification, the new RL identification, and the new cell identification from the request message; and
   reading WTRU measurements from the request message.

10. The method according to claim 9, wherein the WTRU measurements include the downlink timeslot interference signal code power and the downlink primary common control physical channel received signal code power.

11. The method according to claim 8, wherein the Node B measurements include:
   common measurements, including uplink interference signal code power and downlink transmitted carrier power; and
   dedicated measurements, including downlink transmitted code power.

12. The method according to claim 8, wherein the WTRU capability information includes:
   uplink WTRU capability information, including:
      the maximum number of timeslots per frame; and
      the maximum number of uplink physical channels per timeslot; and downlink WTRU capability information, including:
      the maximum number of timeslots per frame; and
      the maximum number of downlink physical channels per frame.

13. The method according to claim 8, wherein the allocating step includes the steps of:
   checking the availability of a code in the new cell;
   generating timeslot sequences from the list of available timeslots; and
   assigning a code set to the available timeslots in a timeslot sequence to find a solution, wherein a successful assignment is a solution.

14. The method according to claim 13, wherein the allocating step further includes the steps of:
   calculating an interference signal code power (ISCP) value for the solution; and
   selecting the solution having the lowest weighted ISCP value as an optimal solution.

15. The method according to claim 8, wherein the storing step includes:
   recording new RL information from the request message;
   recording physical channel information; and
   updating code vector information.

16. The method according to claim 15, wherein the storing step further includes recording the new radio resource control transaction identification.

17. The method according to claim 15, wherein the RL information includes:
   the RL identification;
   the cell identification;
   uplink code composite transport channel (CCTrCH) information; and
   downlink CCTrCH information.

18. The method according to claim 17, wherein the CCTrCH information includes:
   a CCTrCH identification;
   a CCTrCH status;
   a CCTrCH signal to interference ratio target;
   a guaranteed data rate;
   an allowed data rate; and
   the dedicated physical channel (DPCH) information.

19. The method according to claim 18, wherein the DPCH information includes:
   a list of DPCH timeslot information;
   a repetition period value; and
   a repetition length value.

20. The method according to claim 19, wherein the DPCH timeslot information includes:
   a timeslot number;
   a midamble shift and burst type;
   a transport format combination indicator presence; and
   code information.

21. The method according to claim 20, wherein the code information includes:
   a channelized code;
   a code usage status;
   a dedicated physical channel identification; and
   a code signal to interference target.

22. The method according to claim 15, wherein the code vector information includes:
   uplink code vector information, including:
      a code identification;
      a code block indication; and
      a code usage status; and
   downlink code vector information, including:
      a code identification; and
      a code usage status.

23. The method according to claim 8, wherein the creating step includes:
   filling both uplink (UL) and downlink CCTrCH information with physical channel information to the response message;
   filling dedicated channel information to the response message;
   filling UL timeslot ISCP information to the response message; and
   filling power control information to the response message.

24. The method according to claim 23, wherein the CCTrCH information includes:
   a CCTrCH identification; and
   dedicated physical channel (DPCH) information.

25. The method according to claim 24, wherein the DPCH information includes:
   a list of timeslot information;
   a repetition period value; and
   a repetition length value.

26. The method according to claim 25, wherein the timeslot information includes:
   the timeslot number;
   a midamble shift and burst type;
   a transport format combination indicator presence; and
   a list of code information.

27. The method according to claim 26, wherein the code information includes:
   a channelized code; and
   a DPCH identification.

28. The method according to claim 23, wherein the UL timeslot ISCP information includes:
   a timeslot number and
   a timeslot ISCP.

29. The method according to claim 23, wherein the power control information includes:
   an uplink (UL) target signal to interference ratio (SIR);
   a maximum UL SIR;
   a minimum UL SIR;
   an initial downlink (DL) transmission power;
   a maximum DL transmission power; and
   a minimum DL transmission power.

* * * * *

UNITED STATES PATENT AND TRADEMARK OFFICE
CERTIFICATE OF CORRECTION

| | | |
|---|---|---|
| PATENT NO. | : 7,136,656 B2 | Page 1 of 1 |
| APPLICATION NO. | : 10/750129 | |
| DATED | : November 14, 2006 | |
| INVENTOR(S) | : Xiaochun Xu Fisher | |

It is certified that error appears in the above-identified patent and that said Letters Patent is hereby corrected as shown below:

ON THE FACE PAGE

At Item (56), U.S. PATENT DOCUMENTS, page 1, left column, after "5,359,596 A * 10/1994 Sadiq ... 370/362", insert --6,246,881 06/2001 Parantainen et al.--.

At Item (56), U.S. PATENT DOCUMENTS, page 1, right column, line 1, after "6,473,442 B1 * 10/2002", delete "Lundsjo et al." and insert therefor --Lundsjö et al.--.

At Item (56), U.S. PATENT DOCUMENTS, page 1, right column, after "2002/0119796 A1 * 8/2002 Vanghi ... 455/522", insert --2002/0181550 12/2002 Zeira et al.--.

At Item (56), after U.S. PATENT DOCUMENTS, insert
--FOREIGN PATENT DOCUMENTS
0940999 09/1999 EP
00/18034 03/2000 WO
01/35692 05/2001 WO
02/05441 01/2002 WO--.

IN THE CLAIMS

At claim 3, column 8, line 6, before the word "step", delete "the request message".

Signed and Sealed this

Twelfth day of June, 2007

JON W. DUDAS
*Director of the United States Patent and Trademark Office*